(12) United States Patent
Nagasaka et al.

(10) Patent No.: US 10,465,943 B2
(45) Date of Patent: Nov. 5, 2019

(54) WATER HEAT EXCHANGER WITH TUBE DRAINAGE MEMBER

(71) Applicant: Rinnai Corporation, Nagoya-shi, Aichi (JP)

(72) Inventors: Toshimitsu Nagasaka, Nagoya (JP); Takaaki Nakagoshi, Nagoya (JP)

(73) Assignee: Rinnai Corporation, Nagoya-shi (JP)

( * ) Notice: Subject to any disclaimer, the term of this patent is extended or adjusted under 35 U.S.C. 154(b) by 101 days.

(21) Appl. No.: 15/665,622

(22) Filed: Aug. 1, 2017

(65) Prior Publication Data

US 2018/0058717 A1 Mar. 1, 2018

(30) Foreign Application Priority Data

Aug. 25, 2016 (JP) ................................. 2016-164504

(51) Int. Cl.
| | | |
|---|---|---|
| F24H 1/22 | (2006.01) | |
| F24H 1/26 | (2006.01) | |
| F24H 1/52 | (2006.01) | |
| F24H 9/12 | (2006.01) | |
| F28D 7/08 | (2006.01) | |
| F28F 7/02 | (2006.01) | |
| F24H 8/00 | (2006.01) | |
| F28F 17/00 | (2006.01) | |
| F04D 25/04 | (2006.01) | |

(52) U.S. Cl.
CPC .............. *F24H 1/263* (2013.01); *F24H 1/526* (2013.01); *F24H 8/006* (2013.01); *F24H 9/122* (2013.01); *F28D 7/08* (2013.01); *F28F 7/02* (2013.01); *F28F 17/005* (2013.01); *F04D 25/04* (2013.01); *F28F 2265/22* (2013.01); *Y02B 30/106* (2013.01)

(58) Field of Classification Search
CPC .......... F24H 1/263; F24H 1/526; F24H 8/006; F24H 9/122; F28D 7/08; F28F 7/02; F28F 17/005; F28F 2265/22; F04D 25/04; Y02B 30/106
See application file for complete search history.

(56) References Cited

U.S. PATENT DOCUMENTS

| | | |
|---|---|---|
| 3,837,396 A | 9/1974 | Newton |
| 2010/0300647 A1 | 12/2010 | Steurer et al. |

FOREIGN PATENT DOCUMENTS

| | | |
|---|---|---|
| EP | 1267134 | 12/2002 |
| JP | 2015-114003 | 6/2015 |

OTHER PUBLICATIONS

Extended European Search Report for European Patent Application No. 17185348.4 dated Feb. 9, 2018.

*Primary Examiner* — Travis C Ruby
(74) *Attorney, Agent, or Firm* — Amin, Turocy & Watson LLP

(57) ABSTRACT

A heat exchanger having a drainage member (1) mounted on an open end (322) of a heat-transfer tube (32), wherein the drainage member (1) contains a flow guide portion (11) including an insertion portion (11*a*) configured to be inserted into the heat-transfer tube (32) from the open end (322), and a projecting portion (11*b*) projecting toward an outside of the heat-transfer tube (32) from the open end (322) and extending downward.

5 Claims, 7 Drawing Sheets

WATER HEAT EXCHANGER WITH TUBE DRAINAGE MEMBER

FIELD OF THE INVENTION

The present invention relates to a heat exchanger having a drainage member for draining remaining water in a heat-transfer tube and a water heater including the heat exchanger.

BACKGROUND ART

A heat exchanger mounted in an apparatus such as a water heater, a heat source device for a room heater and the like has a case body in which combustion exhaust gas flows, a plurality of heat-transfer pipes arranged in a vertical direction and a horizontal direction inside the case body, and a header provided in a side wall outer surface of the case body. Open ends of the plurality of heat-transfer pipes communicate each other in the header. In this type of heat exchanger, water needs to be drained from insides of the heat-transfer tubes in order to prevent freezing of the water inside the heat-transfer tubes in winter. There has been proposed a technique of disposing a drainage plate made of punching metal facing an open end of each of the heat-transfer tubes inside the header so that the water is prevented from remaining in a vicinity of the open end of the heat-transfer tube and the water is smoothly drained from an inside of the heat-transfer tube. (For example, Japanese Unexamined Patent Publication No. 2015-114003 A)

However, the drainage plate made of the punching metal used in the above-described conventional heat exchanger has punched holes of a smaller diameter than that of the heat-transfer tube at the open end. This poses a problem that the open end of the heat-transfer tube is partially closed by the drainage plate, so that a pressure loss in a water passage of the heat-transfer tube becomes large during normal operation. Particularly, when the diameter of the heat-transfer tube is reduced, the pressure loss due to the drainage plate becomes larger. Moreover, in the case where the above-described drainage plate is used in a sensible heat exchanger having a relatively high temperature in the heat-transfer tube, as compared with a latent heat exchanger, there is a possibility that the punched holes are clogged with deposit such as calcium and the like deposited inside the heat-transfer tube.

SUMMARY OF THE INVENTION

The present invention has been made in view of the foregoing problem, and an object of the present invention is to provide a heat exchanger having a small pressure loss in a water passage of a heat-transfer tube during normal operation, and capable of smoothly draining remaining water inside the heat-transfer tube during drainage work, even when a diameter of the heat-transfer tube is reduced, and a water heater using the heat exchanger.

According to the present invention, there is provided a heat exchanger configured to heat a fluid by heat exchange with combustion exhaust gas ejected from a burner, the heat exchanger comprising:

a case body;

a plurality of heat-transfer tubes arranged in at least a vertical direction inside the case body;

a header configured to communicate open ends of the plurality of heat-transfer tubes arranged in the vertical direction, the header being provided in a side wall outer surface of the case body, and having a header body to which the open ends of the plurality of heat-transfer tubes are connected, and a header cover joined to the header body;

a drainage member disposed at at least one of the open ends protruding into an internal space of the header, the drainage member having a flow guide portion including an insertion portion configured to be inserted into the heat-transfer tube from the open end, and a projecting portion provided continuously to the insertion portion so as to project toward an outside of the heat-transfer tube from the open end, and further extend downward; and a flow guide space configured to guide the fluid inside the heat-transfer tube to the outside of the heat-transfer tube, when the insertion portion is inserted into the heat-transfer tube from the open end, the flow guide space being formed continuously between the insertion portion and a lower inner wall of the heat-transfer tube, and between the projecting portion and the open end of the heat-transfer tube.

According to the heat exchanger of the present invention, the use of the above-described drainage member can suppress an increase in pressure loss of the water passage of the heat-transfer tube during the normal operation, even when the diameter of the heat-transfer tube is reduced. Moreover, in the drainage work, water hardly remains in a vicinity of the open end of the heat-transfer tube, so that the water can be smoothly drained from the heat-transfer tube.

Further, according to the water heater of the present invention including the above-described heat exchanger, high hot water supply capacity, favorable usability, and excellent durability can be obtained.

Other objects, features and advantages of the present invention will become more fully understood from the detailed description given hereinbelow and the accompanying drawings which are given byway of illustration only, and thus are not to be considered as limiting the present invention.

DESCRIPTION OF EMBODIMENTS

Hereinafter, referring to drawings, a heat exchanger and a water heater according to an embodiment of the present invention will be described in detail.

Figure 1:
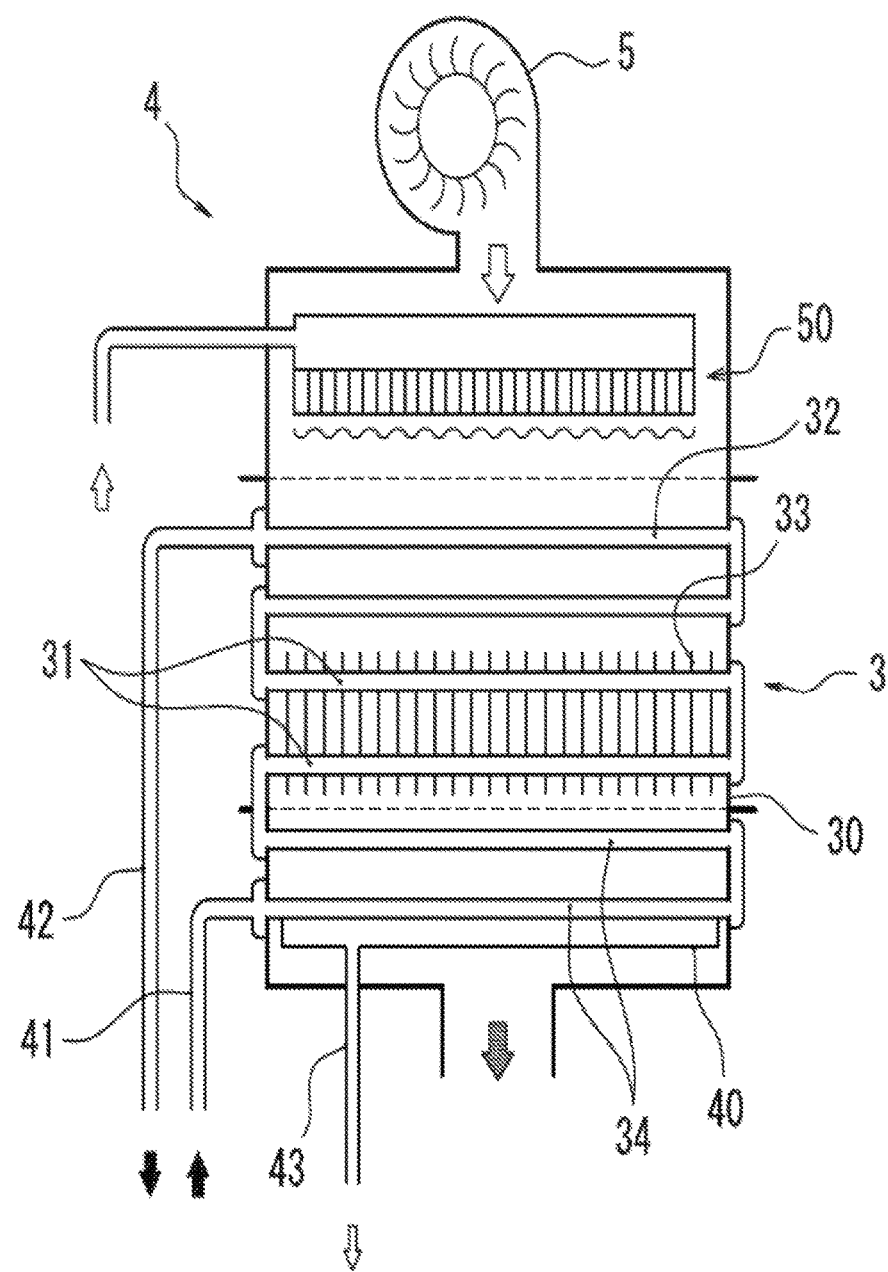
FIG. 1 is a schematic cross-sectional view showing one example of a water heater having a heat exchanger according to a first embodiment of the present invention.

As shown in FIG. 1, a heat exchanger 3 according to the embodiment of the present invention is incorporated into a water heater 4. A gas burner 50 having a downward combustion surface is disposed in an upper region of the water heater 4. Further, a sensible heat exchanger having a substantially rectangular box-shape case body 30 in which a plurality of heat-transfer tubes 31, 32 and a plurality of heat transfer fins 33 are accommodated, and a latent heat exchanger having a case body (not shown) in which a plurality of heat-transfer tubes 34 are accommodated, are disposed in this order under the gas burner 50.

A fan unit 5 configured to supply external air taken in as combustion air to the gas burner 50 is connected to an upper side of the gas burner 50. Combustion exhaust gas ejected from the gas burner 50 is sent to the case body 30 of the heat exchanger 3, and discharged outside from a lower side of the heat-transfer tubes 34 by the fan unit 5.

In the following description of the present specification, an outer surface of a side wall 301 corresponds to the front of the heat exchanger 3, the depth direction as viewed from the front of the case body 30 corresponds to the longitudinal direction and the width direction and the height direction as similarly viewed correspond to the horizontal direction and the vertical direction, respectively.

Water as a fluid from a water supply pipe 41 is first supplied to the heat-transfer tubes 34 provided in a lowermost portion, and then, preheated by recovering latent heat in the combustion exhaust gas ejected from the gas burner 50. Subsequently, the preheated water flows into the first heat-transfer tubes 31 located in a lower half of the case body 30, and then, flows into the second heat-transfer tubes 32 located in an upper half of the case body 30. The water passing through the first and second heat-transfer tubes 31, 32 is heated by heat exchange with the combustion exhaust gas ejected from the gas burner 50 and, the heated water is supplied to a hot-water supplying terminal through a hot-water supply pipe 42. Meanwhile, acid drain generated on surfaces of the heat transfer fins 33 and the heat-transfer tubes 34 through the heat exchange is collected by a drain receiver 40 to discharge outside through a drain neutralizer (not shown) from a drain pipe 43.

Figure 2:
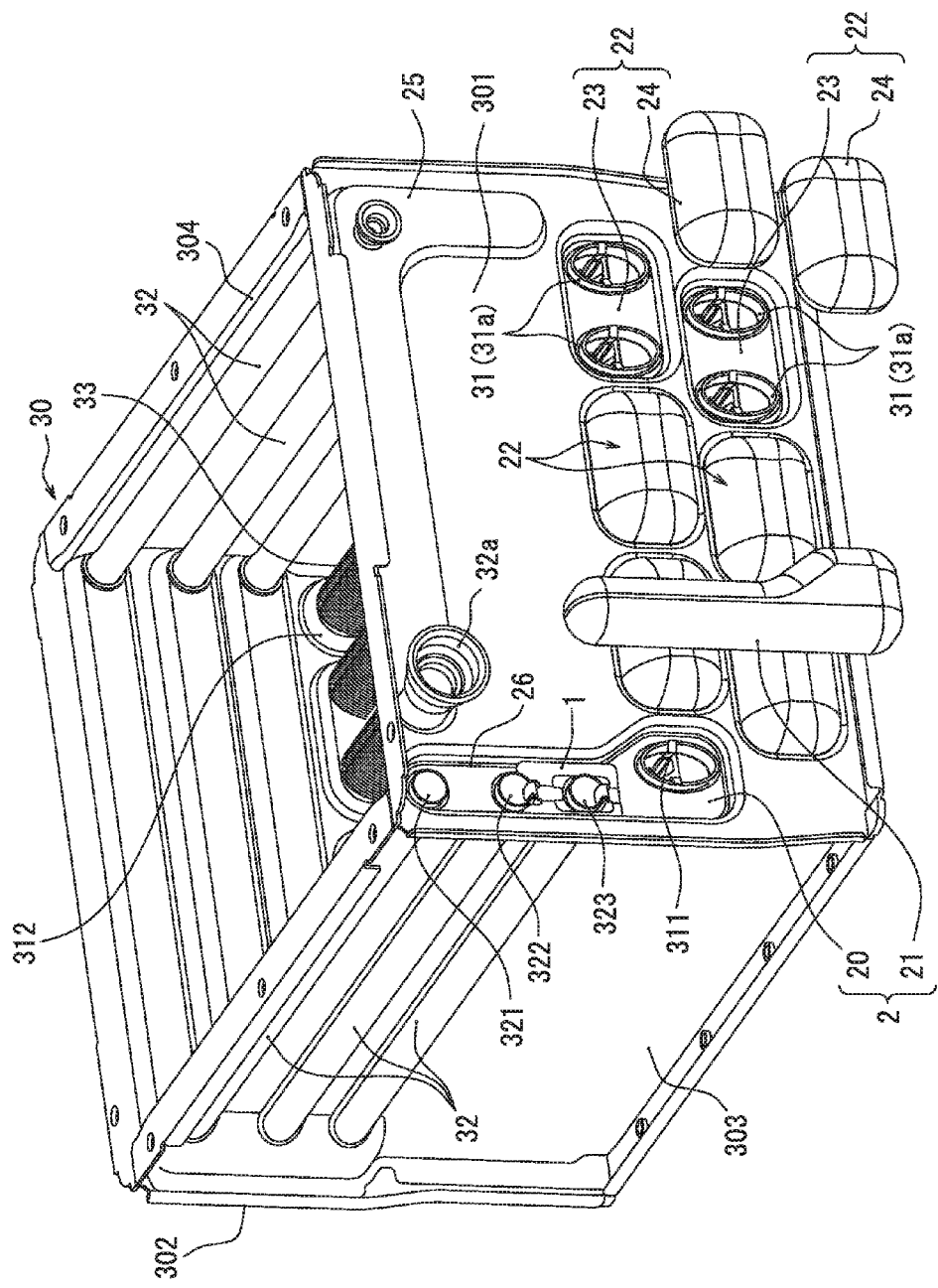
FIG. 2 is a schematic partial exploded perspective view showing one example of the heat exchanger according to the first embodiment of the present invention.

FIG. 2 is a schematic partial exploded perspective view of the case body 30. In a space in the lower half inside the case body 30, a plurality of plate-shape heat transfer fins 33 made of stainless-steel based metal are juxtaposed each other at predetermined intervals in parallel with both side walls 301, 302, and the plurality of straight first heat-transfer tubes 31 penetrating through these both side walls 301, 302 and the heat transfer fins 33 are arranged in parallel with one another.

The plurality of first heat-transfer tubes 31 are arranged in a so-called staggered shape in two upper and lower stages. The first heat-transfer tubes 31 are each made of a straight tube having a substantially elliptical cross-sectional shape elongated in a vertical direction. Moreover, the adjacent two first heat-transfer tubes 31, 31 communicate with each other through one horizontally-long header 22. Further, a downstream-side open end portion 311 of the first heat-transfer tubes 31 communicates with the second heat-transfer tubes 32 through a vertically-long header 2.

The second heat-transfer tubes 32 are each made of a straight tube having a substantially circular cross-sectional shape and a diameter narrower than a minor axis of the first heat-transfer tube 31. Moreover, the plurality of second heat-transfer tubes 32 are disposed along substantially upper halves of side walls 303, 302, 304. Further, the plurality of second heat-transfer tubes 32 at a downstream side are collected into one through a collecting header 25 provided in the side wall 301. Although not shown, downstream-side open end portions of the second heat-transfer tubes 32 communicate with a downstream-side open end portion 32a through the collecting header 25.

According to the heat exchanger 3 of present embodiment, a part of sensible heat in the combustion exhaust gas introduced from the gas burner 50 into the case body 30 is recovered by the second heat-transfer tubes 32, and then sensible heat and latent heat in the combustion exhaust gas are further recovered by the first heat-absorbing tubes 31. The second heat-transfer tubes 32 are arranged along the substantially upper halves of the side walls 301, 302, 303, 304 to prevent the case body 30 from overheating.

The headers 22 are provided in outer surfaces in lower halves of the side walls 301, 302 opposed to each other. The headers 22 each have a header body 23 and a header cover 24. The header body 23 is formed by depressing a part of each of the side walls 301, 302 inward by subjecting drawing to a predetermined portion of each of the side walls 301, 302, and the header cover 24 is brazed to a peripheral edge of the header body 23 so as to close an open end of the header body 23. This allows an internal space in a predetermined size to be formed between a depressed bottom surface of the header body 23 and a back surface of the header cover 24. Open ends 31a of the two first heat-transfer tubes 31 protrude into the internal space.

Moreover, in the outer surface in the substantially upper half of the side wall 301 of the case body 30, on the upstream side is provided the vertically-long header 2 configured to communicate the downstream-side open end portion 311 of the first heat-transfer tubes 31 with open ends 321, 322, 323 of the three second heat-transfer tubes 32 arranged in the vertical direction, and on the downstream side is provided the horizontally-long, substantially L-shape collecting header 25 configured to collect the water flowing out from the three second heat-transfer tubes 32.

The header 2 has a header body 20 and a header cover 21. The vertically-long header body 20 is formed by depressing a part of the side wall 301 inward by subjecting drawing to a predetermined portion close to a left side end of the side wall 301 of the case body 30 in FIG. 2, and the header cover 21 is brazed to a peripheral edge of the header body 20 so as to close an open end of the header body 20. This allows an internal space in a predetermined size to be formed between a depressed bottom surface 20a of the header body 20 and a back surface of the header cover 21. The downstream-side open end portion 311 of the first heat-transfer tubes 31 and the open ends 321, 322, 323 of the three second heat-transfer tubes 32 protrude into the internal space.

In the present embodiment, an open end of the header cover 21 is fitted into a step portion 26 provided along a peripheral edge of the depressed bottom surface 20a, and brazed to the header body 20. Moreover, the header body 20 is integrally formed with the side wall 301 by the drawing and accordingly, the depressed bottom surface 20a is continuous to the outer surface of the side wall 301.

The water introduced from the water supply pipe 41 into the heat exchanger 3 through the heat-transfer tubes 34 flows through an upstream-side open end portion 312 protruding from a lower end portion of the side wall 302 to the heat-transfer tubes 31. Subsequently, the water flows through the heat-transfer tubes 31 and the header 22 in this order, and further flows through the header 2 to the three heat-transfer tubes 32 from the downstream-side open end portion 311 disposed in the side wall 301. Furthermore, the water flows through the heat-transfer tubes 32 deposited along the side walls 303, 302, 304. Thereafter, the water is collected by the collecting header 25, and discharged from the downstream-side open end portion 32a to the hot-water supply pipe 42.

In the heat exchanger 3 according to the present embodiment, in order to prevent freezing of the water inside the heat-transfer tubes 31, 32 in winter, the water in the heat-transfer tubes 31, 32 is drained by drainage work. Particularly, when the water is drained from the heat-transfer tubes 32 each having a small diameter, water membranes due to a surface tension of the water are easily formed at the upstream-side open ends 321, 322, 323.

However, according to the present embodiment, in order to prevent formation of the water membranes and smoothly drain the water, a drainage member 1 configured to form a flow guide space as a drainage flow passage is mounted on the open ends 322, 323 of the two second heat-transfer tubes 32 in middle and lower stages among the three second heat-transfer tubes 32.

During the drainage work, since air first flows into the second heat-transfer tube 32 in an upper stage through a downstream-side open end portion 32a, the water inside the second heat-transfer tube 32 in the upper stage is drained relatively easily. Accordingly, there is no need to mount the drainage member 1 on the open end 321 of the second heat-transfer tube 32 in the upper stage. However, in order to drain the water smoothly, the drainage member 1 may be mounted on the open end 321 of the second heat-transfer tube 32 in the upper stage.

Figure 3:
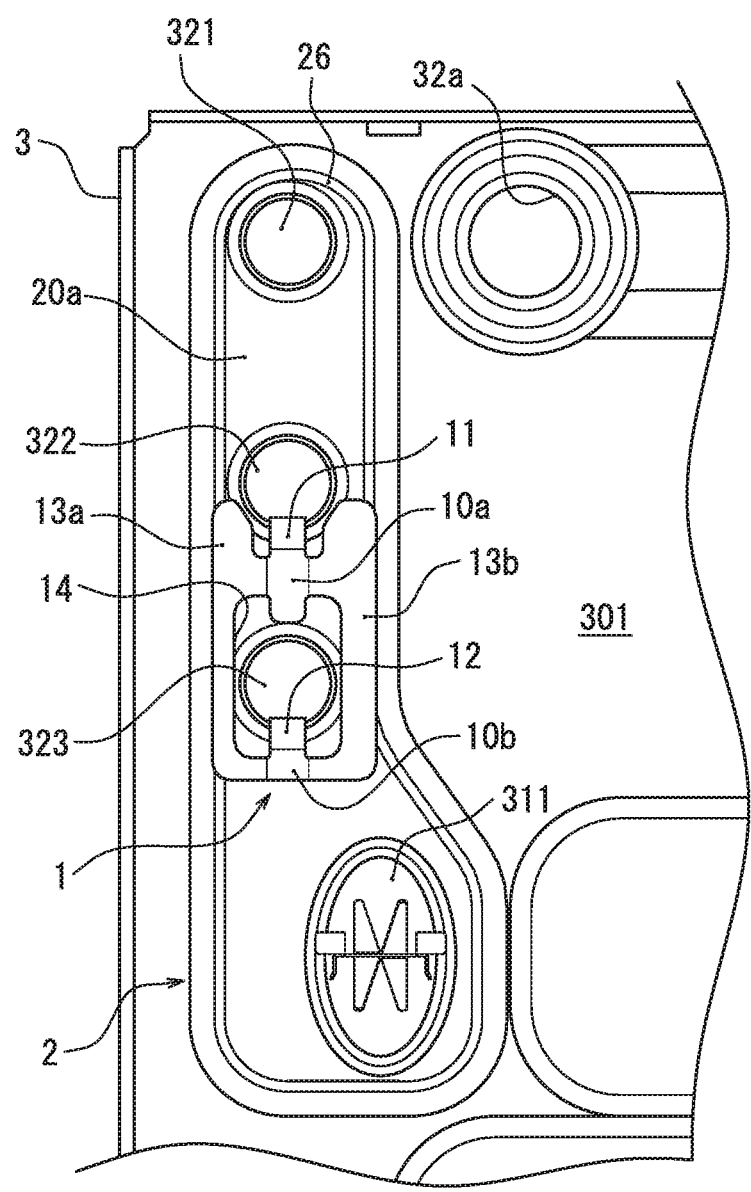
FIG. 3 is a schematic partial enlarged view showing one example of the heat exchanger according to the first embodiment of the present invention.
Figure 4:
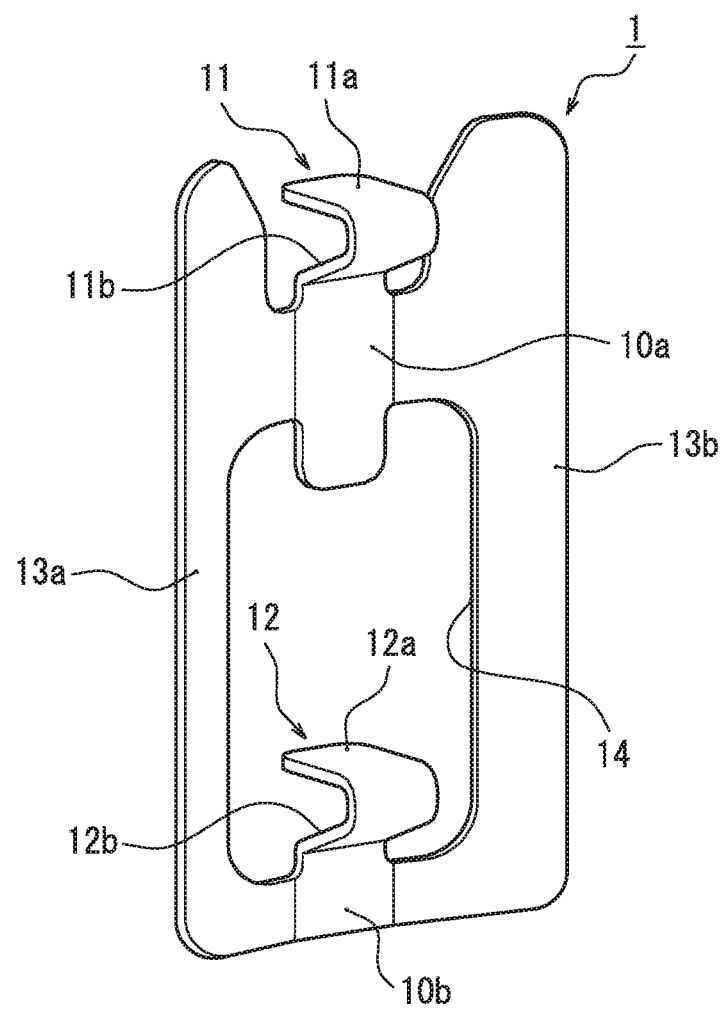
FIG. 4 is a schematic perspective view showing one example of a drainage member mounted on an open end of a heat-transfer tube of the heat exchanger according to the first embodiment of the present invention.

As shown in FIGS. 3 and 4, the drainage member 1 according to a first embodiment has a plate-shape body including substantially sideways U-shape (i.e. backwards C-shape) flow guide portions 11, 12 configured to be mounted on the open ends 322, 323 of the two second heat-transfer tubes 32 in the middle stage and the lower stage, hanging portions 10a, 10b extending downward from the flow guide portions 11, 12, respectively, and extending portions 13a, 13b protruding in both lateral directions from the hanging portions 10a, 10b to couple the upper and lower flow guide portions 11, 12 and the hanging portions 10a, 10b through an opening 14. The extending portions 13a, 13b are inclined in such a manner that lateral end portions of the extending portions 13a, 13b project toward the header cover 21, as compared with base end portions corresponding to both lateral sides of the hanging portions 10a, 10b continuously provided from the flow guide portions 11, 12.

Further, the extending portions 13a, 13b are formed asymmetrically in such a manner that the extending portion 13b is wider than the extending portions 13a. This prevents erroneous mounting of the drainage member 1 in the vertical direction.

In the above-described flow guide portions 11, 12, upper half bodies provided on an upper side of respective bent portions function as insertion portions 11a, 12a to be inserted into the second heat-transfer tubes 32, and lower half bodies provided on a lower side of the respective bent portions function as projecting portions 11b, 12b. The hanging portions 10a, 10b are extended continuously downward from lower ends of the projecting portions 11b, 12b, respectively.

Figure 5:
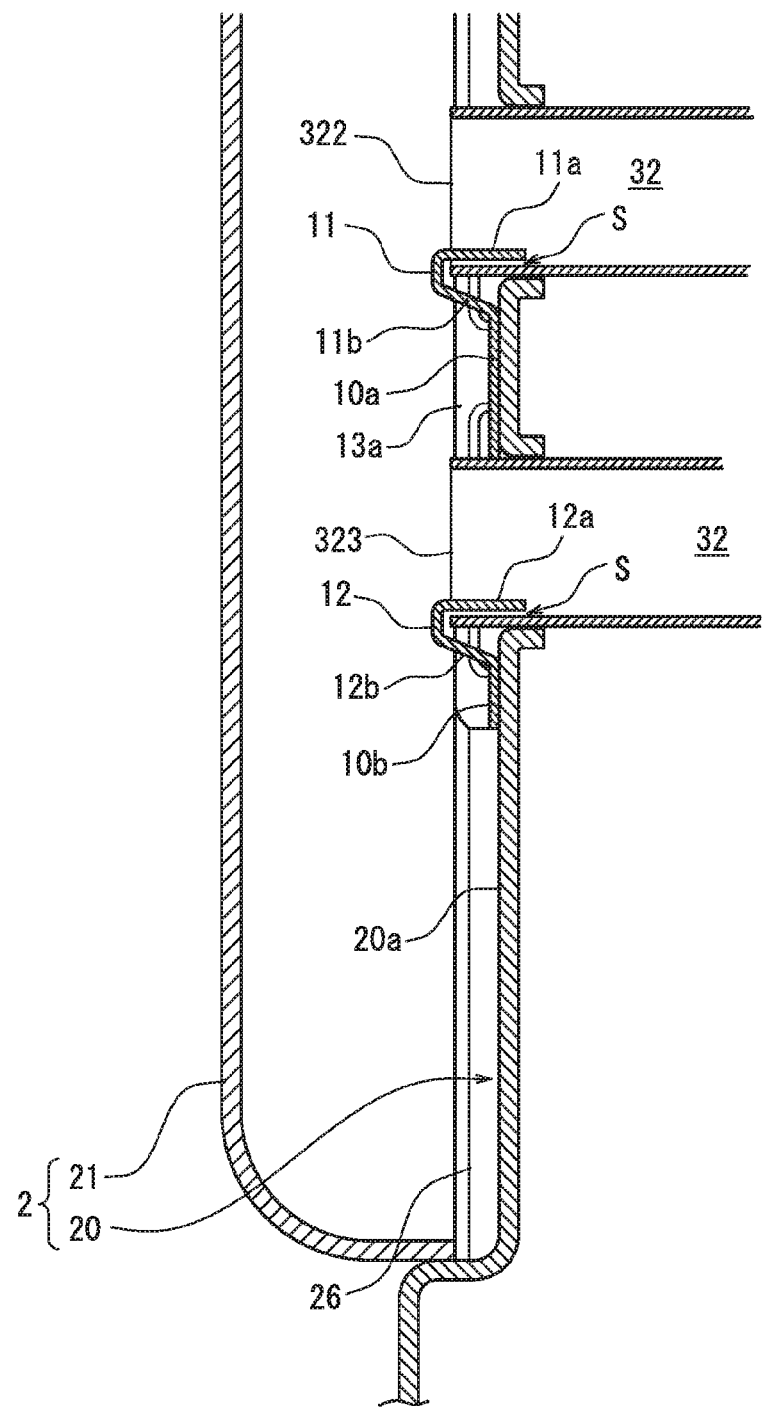
FIG. 5 is a schematic vertical cross-sectional view showing a state where the drainage member is mounted on the open ends of the heat-transfer tubes of the heat exchanger according to the first embodiment of the present invention.

As shown in FIG. 5, when the insertion portion 11a of the flow guide portion 11 is inserted into the second heat-transfer tube 32 in the middle stage from the opening end 322 of the second heat-transfer tube 32 in the middle stage along a lower inner wall thereof, the insertion portion 12a of the flow guide portion 12 is inserted into the second heat-transfer tube 32 in the lower stage from the open end 323 of the second heat-transfer tube 32 in the lower stage along a lower inner wall thereof. Moreover, at this time, back surfaces of the hanging portions 10a, 10b come into close contact with the depressed bottom surface 20a of the header body 20, and a lower end of the hanging portion 10a abuts on an outer wall top portion of a protruding end portion of the open end 323 of the second heat-transfer tube 32 in the lower stage. For the drainage member 1, dimensions of the respective portions are set so as to configure the above-described mounting form.

The left and right extending portions 13a, 13b are formed in such a manner that the lateral end portions thereof are set on the step portion 26 formed in the peripheral edge of the depressed bottom surface 20a of the header body 20. When the header cover 21 is joined to the header body 20, the lateral end portions of the extending portions 13a, 13b are pressed by the open end of the header cover 21. This allows the flow guide portions 11, 12 to be mounted on the open ends 322, 323 of the two second heat-transfer tubes 32 in the middle stage and the lower stage so as to be prevented from being detached off. Moreover, mounting the drainage member 1 on the open ends 322, 323 in the foregoing manner prevents the drainage member 1 from deviating or moving vertically.

When the drainage member 1 is mounted on the opening ends 322, 323, both side end edges of the flat plate-shape insertion portions 11a, 12a abut on the lower inner walls of the second heat-transfer tubes 32, so that continuous spaces S are formed between the insertion portions 11a, 12a and the lower inner walls of the second heat-transfer tubes 32, and between the open ends 322, 323 and the projecting portions 11b, 12b projecting outward from the open ends 322, 323.

A gap between the insertion portions 11a, 12a and the lower inner walls of the second heat-transfer tubes 32 is formed by the lower end of the hanging portion 10a abutting on the outer wall top portion of the protruding end portion of the open end 323 of the second heat-transfer tube 32 in the lower stage. Accordingly, the both side end edges of the insertion portions 11a, 12a may not abut on the lower inner walls of the second heat-transfer tubes 32.

According to the above-described embodiment, among the three second heat-transfer tubes 32 arranged in the vertical direction, the insertion portions 11a, 12a of the flow guide portions 11, 12 of the drainage member 1 are inserted into the open ends 322, 323 of the two lower second heat-transfer tubes 32 in which the water easily remains at the time of the drainage work. Accordingly, even if the second heat-transfer tubes 32 each having a small diameter are used, the water membranes due to a surface tension of the water are hardly formed at the open ends 322, 323.

Moreover, when the water remaining in lower regions of the inner walls of the second heat-transfer tubes 32 in the vicinity of the open ends 322, 323 comes into contact with the insertion portions 11a, 12a of the flow guide portions 11, 12, the water is drawn to sides of the open ends 322, 323 through the above-described spaces S by surface tensions at the insertion portions 11a, 12a and the projecting portions 11b, 12b. Consequently, the water flows toward the projecting portions 11b, 12b of the flow guide portions 11, 12, and then, falls downward by its own weight from the open ends 322, 323. This allows the remaining water in the vicinity of the open ends 322, 323 of the second heat-transfer tubes 32 to be smoothly discharged.

As the above-described drainage member 1, a coupled body configured to be simultaneously mounted on the open ends 322, 323 of the two second heat-transfer tubes 32 arranged in the vertical direction is used. However, there may be used separate bodies obtained by dividing the extending portions 13a, 13b into upper portions and lower portions at substantially centers to be mounted on the open ends 322, 323, respectively.

Moreover, although the extending portions 13a, 13b are extended respectively from the both lateral sides of the hanging portions 10a, 10b, those may be extended respectively from both lateral sides of the insertion portions 11a, 12a of the flow guide portions 11, 12.

Figure 6:
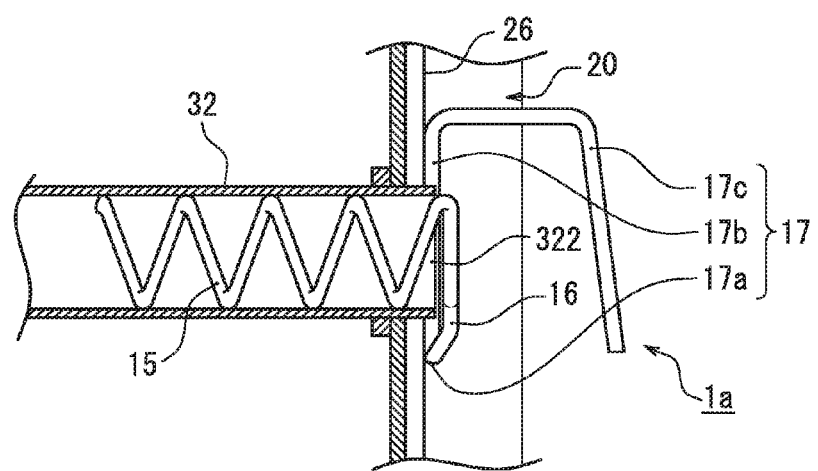
FIG. 6 is a schematic vertical cross-sectional view showing a state where a drainage member is mounted on an open end of a heat-transfer tube of a heat exchanger according to a second embodiment of the present invention.
Figure 7:
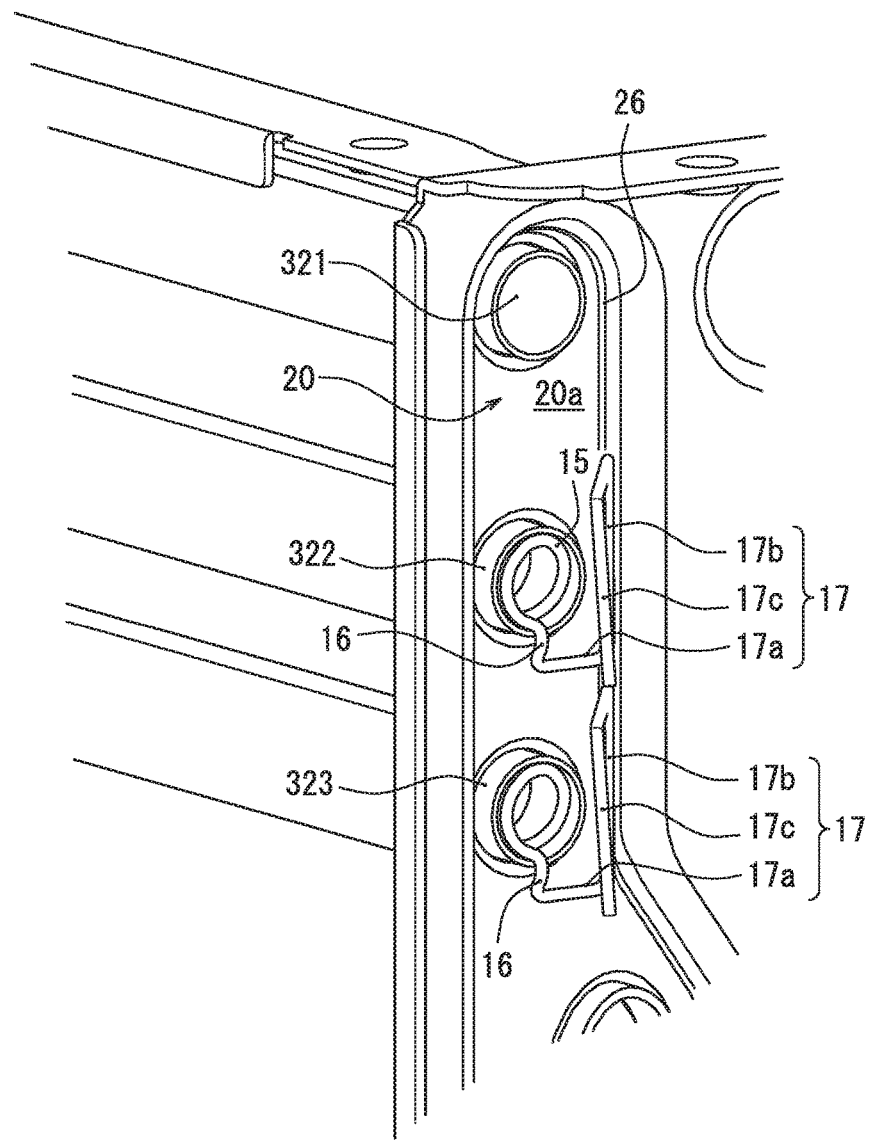
FIG. 7 is a schematic partial enlarged perspective view showing one example of the heat exchanger according to the second embodiment of the present invention.

FIGS. 6 and 7 are schematic explanatory views of a drainage member 1a according to a second embodiment. The same reference signs will be given to features that are common to those of the first embodiment, thereby omitting explanation thereof.

The drainage member 1a has a coil-shape insertion portion 15 configured to be inserted into the second heat-transfer tube 32, a projecting portion 16 projecting from each of the open ends 322, 323, which is formed by bending downward a forefront portion of the coil, and an extending portion 17 where a first extending portion 17a extending laterally toward the step portion 26 in the peripheral edge of the header body 20 from a lower end of the projecting portion 16, a second extending portion 17b standing up along the step portion 26 from an extension end of the first extending portion 17a, and a third extending portion 17c extending toward a header cover not shown from an upper end of the second extending portion 17b are continuously connected.

The coil as the insertion portion 15 has a diameter substantially equal to an internal diameter of the second heat-transfer tube 32. Moreover, when the coil-shape insertion portion 15 is inserted into the second heat-transfer tube 32 from each of the opening ends 322, 323, the projecting portion 16 is disposed slightly apart from each of the open ends 322, 323 so as to be formed a small gap therebetween, and the second extending portion 17b is set on the step portion 26. When in this disposition state, the open end of the header body 20 is closed by the header cover, the third extending portion 17c is pressed by the back surface of the header cover, and the second extending portion 17b is pressed by the open end of the header cover. This allows the drainage member 1a to be mounted on each of the opening ends 322, 323 of the second heat-transfer tube 32 with a predetermined posture. Accordingly, mounting the drainage member 1a on each of the open ends 322, 323 prevents the drainage member 1a from deviating or moving vertically. In this embodiment, a space is formed by non-contact portions with the lower inner wall of the second heat-transfer tube 32 in the insertion portion 15. Therefore, a continuous flow guide space is formed by a space between the coil-shape insertion portion 15 and the lower inner wall of the second heat-transfer tube 32, and a space between each of the open ends 322, 323 and the projected portion 16.

According to the present embodiment, during the drainage work, the water remaining in the lower regions of the inner walls of the second heat-transfer tubes 32 in the vicinity of the open ends 322, 323 is drawn to sides of the open ends 322, 323 by surface tensions at the insertion portions 15. Consequently, the water falls downward by its own weight from the space between each of the open ends 322, 323 and the projecting portions 16. This allows the remaining water in the vicinity of the open ends 322, 323 of the second heat-transfer tubes 32 to be smoothly discharged.

As described above, the drainage member 1 according to the first embodiment has the plate-shape body bent into the predetermined shape, while the drainage member 1a according to the second embodiment has a rod-shape body bent into the predetermined shape. The plate-shape or coil-shape insertion portions 11a 12a, 15 are inserted into the heat-transfer tubes 32 from the open ends 322, 323 protruding into the internal space of the header body 20, and the header body 20 is covered with the header cover 21, only by which the drainage member 1, 1a can be easily mounted on the open ends 322, 323 so as to be prevented from being detached off. Moreover, the drainage member 1, 1a can be stably mounted on the opening ends 322, 323 with a small deviation in the vertical direction.

Thus, there can be provided the heat exchanger 3 configured to not only make easy the mounting of the drainage members 1, 1a on the open ends 322, 323, but stably hold postures of the drainage members 1, 1a for a long time.

Moreover, the pressure loss in the water passage of the heat-transfer tubes 32 is low, even when reduction in diameter of the heat-transfer tube 32 is made. Further, since the open ends 322, 323 are not closed by the drainage members 1, 1a, there is less problem of deposit deposited inside the heat-transfer tubes 32.

The drainage members 1, 1a are not limited to structures adopted in the above-described embodiments. A variety of modifications can be made within the scope of the invention. Also, the present invention is not limited to the configuration in which the straight heat-transfer tubes are juxtaposed each other. The present invention may adopt others, for example, a configuration can be adopted in which the heat-transfer tubes are arranged in a horizontal meandering structure, a spiral structure, or a helical structure. Further, the above-described heat exchanger may be used not only for the water heater but for various types of heat exchange apparatuses.

As described in detail, the present invention is summarized as follows.

According to one aspect of the present invention, there is provided a heat exchanger configured to heat a fluid by heat exchange with combustion exhaust gas ejected from a burner, the heat exchanger comprising:

a case body;

a plurality of heat-transfer tubes arranged in at least a vertical direction inside the case body;

a header configured to communicate open ends of the plurality of heat-transfer tubes arranged in the vertical direction, the header being provided in a side wall outer surface of the case body, and having a header body to which the open ends of the plurality of heat-transfer tubes are connected, and a header cover joined to the header body;

a drainage member disposed at at least one of the open ends protruding into an internal space of the header, the drainage member having a flow guide portion including an insertion portion configured to be inserted into the heat-transfer tube from the open end, and a projecting portion provided continuously to the insertion portion so as to project toward an outside of the heat-transfer tube from the open end, and further extend downward; and a flow guide space configured to guide the fluid inside the heat-transfer tube to the outside of the heat-transfer tube, when the insertion portion is inserted into the heat-transfer tube from the open end, the flow guide space being formed continuously between the insertion portion and a lower inner wall of the heat-transfer tube, and between the projecting portion and the open end of the heat-transfer tube.

According to the above-described heat exchanger, during the drainage work, the water remaining in the vicinity of the open end of the heat-transfer tube is drawn to the space between the projecting portion of the flow guide portion and the open end of the heat-transfer tube from the space between the insertion portion and the lower inner wall of the heat-transfer tube, by the surface tension at the flow guide portion of the drainage member. Consequently, the water flowing toward the projecting portion falls downward by its own weight from the open end. Accordingly, the water hardly remains in the vicinity of the open end of the heat-transfer tube, so that the water can be securely drained from the heat-transfer tube.

Moreover, the insertion portion is inserted into the heat-transfer tube, so that the drainage member is mounted on the open end of the heat-transfer tube. Accordingly, the open end of the heat-transfer tube is hardly closed by the drainage member, as compared with a conventional drainage plate made of punching metal. As a result, the pressure loss in the water passage of the heat-transfer tube is low during the normal operation. Further, since the insertion portion is inserted into the heat-transfer tube, the heat-transfer tube is hardly clogged by the deposit. Therefore, the water can be drained smoothly from the heat-transfer tube for a long time.

Preferably, in the above-described heat exchanger, the drainage member has an extending portion extending from an open end side to a back surface of the header cover, wherein the extending portion is pressed by the header cover to hold a posture of the drainage member in the header.

According to the above-described heat exchanger, the extending portion is pressed by the header cover, so that the drainage member is fixed in the header. Accordingly, the insertion portion and the projecting portion can be mounted on the open end of the heat-transfer tube with predetermined postures so as to be securely formed the flow guide space.

Preferably, in the above-described heat exchanger, the open ends of the plurality of heat-transfer tubes protrude outward from an bottom surface of the header body continuous to the side wall outer surface of the case body, the drainage member includes a hanging portion extending downward from a lower end of the flow guide portion, and when the insertion portion is inserted from an upper open end into an upper heat-transfer tube among the two heat-transfer tubes arranged side by side vertically, a back surface of the hanging portion abuts on the bottom surface of the header body, and a lower end of the hanging portion abuts on an outer wall top portion of a lower open end of a lower heat-transfer tube.

According to the above-described heat exchanger, since the deviation of the drainage member in the vertical direction is prevented by the hanging portion, the flow guide portion can be reliably positioned with respect to the open end of the heat-transfer tube. Accordingly, the insertion portion can be reliably deposited at a predetermined position in the heat-transfer tube, and the water can be smoothly drained from the heat-transfer tube.

Preferably, in the above-described heat exchanger, two or more of the drainage member are coupled in the vertical direction.

According to the above-described heat exchanger, the drainage member can be mounted easily on the open ends of the plurality of heat-transfer tubes arranged side by side vertically. Moreover, since the deviation of each of the flow guide portions can be prevented after mounting the drainage member, the insertion portions and the projecting portions can be mounted on each of the open ends of the heat-transfer tubes with the predetermined postures.

According to another aspect of the present invention, there is provided a water heater comprising the above-described heat exchanger.

The water heater having high hot water supply capacity and excellent durability can be provided by the use of the heat exchanger.

The present application claims a priority based on a Japanese Patent Application No. 2016-164504 filed on Aug. 25, 2016, the content of which is hereby incorporated by reference in its entirely.

Although the present invention has been described in detail, the foregoing descriptions are merely exemplary at all aspects, and do not limit the present invention thereto. It should be understood that an enormous number of unillustrated modifications may be assumed without departing from the scope of the present invention.

The invention claimed is:

1. A heat exchanger configured to heat a fluid by heat exchange with combustion exhaust gas ejected from a burner, the heat exchanger comprising:

a case body;

a plurality of heat-transfer tubes arranged in at least a vertical direction inside the case body, wherein the fluid heated by the combustion exhaust gas flows through each of the heat-transfer tubes;

a header configured to communicate open ends of the plurality of heat-transfer tubes arranged in the vertical direction, the header being provided in a side wall outer surface of the case body, and having a header body to which the open ends of the plurality of heat-transfer tubes are connected, and a header cover joined to the header body;

a drainage member disposed at at least one of the open ends protruding into an internal space of the header, the drainage member having a flow guide portion including an insertion portion configured to be inserted into the heat-transfer tube from the open end along a lower inner wall of the heat-transfer tube, and a projecting portion provided continuously to the insertion portion so as to project toward an outside of the heat-transfer tube from the open end and being bent downward from a forefront portion of the insertion portion and extended inward to a bottom surface of the header body; and a flow guide space configured to guide the fluid inside the heat-transfer tube to the outside of the heat-transfer tube, when the insertion portion is inserted into the heat-transfer tube from the open end, the flow guide space being formed continuously between the insertion portion and the lower inner wall of the heat-transfer tube, and between the projecting portion and the open end of the heat-transfer tube.

2. The heat exchanger according to claim 1, wherein the drainage member has an extending portion extending from an open end side to a back surface of the header cover, wherein the extending portion is pressed by the header cover to hold a posture of the drainage member in the header.

3. The heat exchanger according to claim 1, wherein the open ends of the plurality of heat-transfer tubes protrude outward from the bottom surface of the header body continuous to the side wall outer surface of the case body, the drainage member includes a hanging portion extending downward from a lower end of the flow guide portion along the bottom surface of the header body, and when the insertion portion is inserted from an upper open end into an upper heat-transfer tube among the two heat-transfer tubes arranged side by side vertically, a back surface of the hanging portion abuts on the bottom surface of the header body, and a lower end of the hanging portion abuts on an outer wall top portion of a lower open end of a lower heat-transfer tube.

4. The heat exchanger according to claim 1, wherein, two or more of the drainage member are coupled in the vertical direction.

5. A water heater comprising the heat exchanger according to claim 1.

* * * * *